March 29, 1960 L. FEIN 2,930,983

MAGNETIC AMPLIFIER DEVICES

Filed Nov. 6, 1953

INVENTOR.
Louis Fein

BY Ezekiel Wolf
his Attorney

United States Patent Office 2,930,983
Patented Mar. 29, 1960

2,930,983

MAGNETIC AMPLIFIER DEVICES

Louis Fein, Arlington, Mass.

Application November 6, 1953, Serial No. 390,561
1 Claim. (Cl. 330—8)

The present invention relates to magnetic devices wherein input, output and control circuits are involved. Such a device is sometimes called an amplifier, but this designation is sometimes inaccurate unless the output voltage in its simplest stage will not exceed the original source potential.

An amplifier of the general type herein discussed involves an input voltage, a magnetic core and coil, and an output circuit which may be in series with the core and the voltage source.

If one looks at the B–H curve for this type of circuit, it may be noted that it passes through the usual hysteresis cycle in which the magnetizing force $H=4\pi ni$. The critical elements for obtaining the necessary flux operation is $ni$, the ampere turns. The resultant magnetization in the core may be obtained either with a large value of $n$ or a large value of $i$ or of course the combination of both.

If now the turns are increased, the inductance in the circuit becomes increased and under normal conditions the build-up time in the circuit is also increased, which in the ordinary electrical circuit may be defined in the terms $$i=\frac{E}{R}\left(1-e^{-\frac{R}{L}t}\right)$$

where E is the applied voltage, R is the resistance in the circuit, L is the inductance and $t$ is the time measured from the application of the voltage.

It may be readily seen that it is undesirable to increase the inductance of the core for the purpose of increasing the magnetizing force.

While it is possible to increase the current value $i$, which is applied, this usually involves high powered circuits of vacuum tubes, the current values running in many milliamperes. For cheapest operation it is desirable to produce circuit apparatus in which operating current values are kept low. The problem therefore of providing rapid response circuits with low current values and avoiding large inductances which would need considerable time for the circuit to build up to the desired operating value is not readily solved.

In the present invention I have developed a circuit which essentially involves an input source, and output source, a magnetic core and a control circuit, in which the build up in the current will substantially follow the applied impulse to the control circuit in such a manner that the maximum amplitude will be immediately realized at the output circuit when the pulse is applied to the control circuit even though the leading edge of the control pulse is substantially a straight line perpendicular to the time axis. In terms of a mathematical statement of condition, this means that $$R=\frac{L}{C}$$

where R is the resistance per section, L the inductance per section, and C the capacitance per section. This is accomplished for any kind of a pulse with small or large current value but the design of the circuit may be such that any system can be properly built to operate with small current values thus avoiding the cost of large current or power amplifiers.

In the present invention the control voltage is applied to the magnetic amplifier through a transmission line which has a selected propagation constant or total time delay desired for the particular circuit involved. This time constant for instance may be of the magnitude of one, two or six micro-seconds or any other chosen time values of smaller or larger magnitudes. The transmission line may terminate in the surge impedance. If termination impedance is the surge impedance, it means that the line has simply no reflection and the line is considered an endless line.

The design of the transmission line may follow the usual course wherein $T=\sqrt{LC}$, where T is the time constant of the transmission line in seconds, L is the inductance and C is the capacity to ground.

The invention is not only applicable to magnetic amplifiers as such, but is also applicable to a great number of other means where rapid and true response is essential. It finds uses in various components for computers and in particular in magnetic reading and recording heads, magnetostriction transducers, meters, magnetic core transformers, magnetic shift register cores, magnetic memory cores, magnetic flip-flop circuits, magnetic gating circuits, magnetic relay circuits and in a great many other devices where no build up time is permitted between the impressed pulse and the response.

Without further describing the merits and advantages of the present invention, the invention will be described in connection with the embodiments set forth in the specification below when taken in connection with the drawings forming a part thereof, in which.

Figure 1:
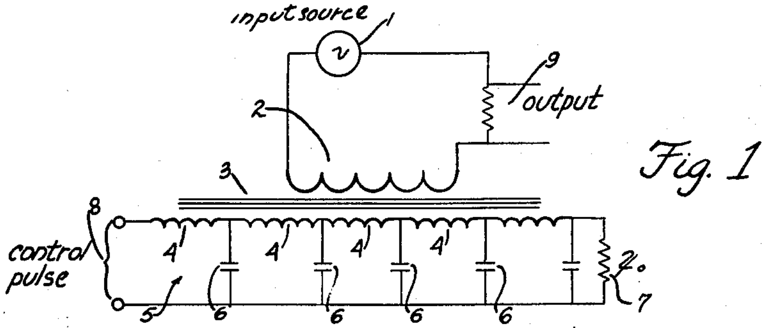
Figure 1 shows schematically the circuit of the present system.

In the arrangement indicated in Figure 1, 1 represents the input source; 2 represents the winding of the magnetic amplifier which has a closed core coupling 3 with the series inductive elements 4, 4, 4, of the transmission line 5. This transmission line may be a coaxial cable or it may be an ordinarily shielded metallic cable with distributed capacity as illustrated by the condensers 6, 6, 6, 6, etc., However in place of the normal coaxial line an artificial line or a line with a periodic loading may also be used. The transmission line 5 may be terminated in an impedance 7 which may be the surge impedance or some other desired impedance value.

If it be assumed that the time delay in the transmission line is for instance two micro-seconds in length, this will mean that a pulse impressed upon the terminals 8 will travel down the length of the line in two micro seconds and produce magnetization on the core 3 of $ni$ ampere turns where $n$ is the total number of turns and $i$ is the magnitude of the current pulse. Since the values of current pulse will not be of equal magnitude simultaneously in all of the turns the magnetized effect may be somewhat less than the value *ni*, but it will be substantially that value. If this magnetizing effect is sufficient to carry beyond the point of saturation, the effect will be to increase the response sharply up to the point of saturation. It is obvious that dependent upon the input voltage source 1, the device can be operated on any portion of the hysteresis loop and can therefore be used for a great many effects as may be desired for circuit control purposes. While the input source may be considered as the regular input of the amplifier, it may in most cases be preferable to use the input source as the constant alternating supply voltage and to consider the input as the control pulse as indicated at 8 and the output as the resistance or impedance 9 or whatever indicating device may be used for that purpose.

Figure 5:
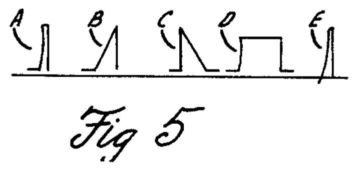

Referring now to Figure 5, there is shown some of the various types of pulses which the present system will readily reproduce and follow. A is a thin square topped pulse. B represents a sharp pulse with a straight leading edge and a slightly inclined trailing edge. C is a pulse representing a slightly inclined leading edge and a sharp trailing edge. D is a pulse similar to A but having a longer duration. E is a sharp pointed pulse with sharp leading and trailing edges.

If the transmission line has a time delay constant substantially as small or smaller than that of the pulses shown in Figure 5, then the pulses will be accurately reproduced in the output circuit 9.

While the circuit will reproduce the type of pulses shown in Figure 5, they will also reproduce pulses whose slopes are not as steep as those shown in the figure. It is quite evident therefore, that the circuit of the present invention has a distinct advantage wherever it is desired to have the circuit closely follow the impressed pulse.

Figures 2, 4:
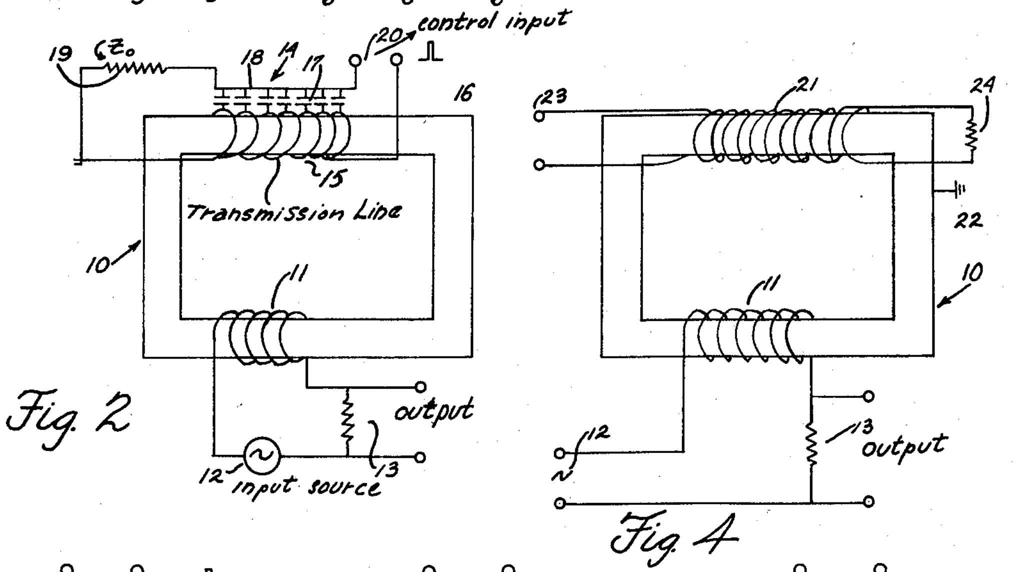
Figure 2 shows a diagram similar to Figure 1 with the transmission line and the input coils forming a part of the transformer.
Figure 4 shows a system according to the arrangement of Figure 2 in which the ground side of the transmission line may be formed with the core of the transformer, and, Figure 5 illustrates some of the types of pulses which may be used in the present system.

In the arrangement indicated in Figure 2, 10 represents the transformer which has a coil 11 winding around it which may be energized by an input source 12 of a constant alternating current source of low or high frequency. 13 represents the output circuit, and 14 the control circuit which comprises a coil 15 wound on a leg 16 of the closed transformer 10.

The coil 15 is preferably composed of a coaxial cable which has distributed capacity with ground represented by the condensers 17 and the ground line 18. This neutral transmission line may be terminated in an impedance $Z_c$ 19 which may be of any desired value. The control impulse or input is impressed across the terminals 20 and a similar amplitude impulse is received across the output 13.

In the arrangement indicated in Figure 4, the circuit is somewhat similar to that of Figure 2. In this case the coil 11 and the source 12 with the output 13 may be the same as in Figure 2. The transmission line however is represented as a coil 21 wound about and insulated from the core 10 which acts as a ground as indicated at 22 establishing the distributed capacity to ground between the coil 21 and the terminal 23 forming the transmission line.

Similarly as in Figure 2, the transmission line may be terminated in a desired impedance 24 as previously explained.

Figure 3:
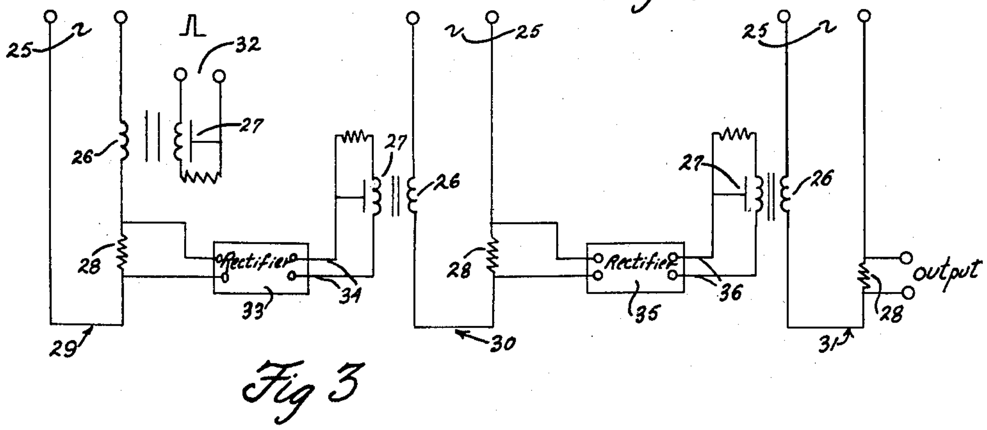
Figure 3 shows a system employing the principle of the present invention in which several stages of amplification are used.

In the arrangement indicated in Figure 3, there is shown a cascade system in which the alternating voltage supply sources are illustrated at 25, 25, 25. The input coils are represented as 26, 26, 26, the coupled transmission lines with distributed capacity to ground as 27, 27, 27, and the outputs in each stage as the impedance 28, 28, 28. 29 may be considered the first stage; 30 the second stage, and 31 the third stage. The control pulse is applied across the terminals 32 and the output 28 is first rectified by the rectifier 33 and impressed across the terminals 34 as the control pulse in the second stage of the system. Similarly the output of the stage 30 is rectified by the rectifier 35 and impressed as a control pulse across its output 36 upon the last stage 31, the output of which may be used in any way that is desired.

It will be seen that in the circuit arrangement of Figure 3, considerable amplification will be obtained. The alternating source 25 need not be of the same potential nor from the same supply line, the voltage amplitude of the poles in the last stage being limited only by its voltage source.

Having now described my invention, I claim:

An amplifier circuit including input terminals adapted to have alternating potential impressed thereon, coupling transformers, each having an input coupling coil and a coaxial cable forming a transmission line having series inductance and capacity to ground wound thereon, output impedances for each of said input coupling coils connected in series therewith and with said input terminals forming individual substantially similar amplifier elements and means for impressing a control pulse upon each of said transmission lines, said means including rectifiers each operatively connected to one output impedance of one unit and the coaxial cable of the next unit whereby a magnetic cascade amplifier is found.

References Cited in the file of this patent

UNITED STATES PATENTS

| | | |
|---|---|---|
| 1,986,112 | Logan | Jan. 1, 1935 |
| 2,238,260 | Hagen | Apr. 15, 1941 |
| 2,388,070 | Middel | Oct. 30, 1945 |
| 2,451,444 | Norde | Oct. 12, 1948 |
| 2,473,917 | Steinert et al. | June 21, 1949 |
| 2,554,203 | Morgan | May 22, 1951 |
| 2,650,350 | Heath | Aug. 25, 1953 |

OTHER REFERENCES

Terman: "Radio Engineer's Handbook," first edition, 1943, McGraw-Hill Book Co. (pages 172–197, particularly pages 173 and 182).